United States Patent
Hara

(10) Patent No.: US 9,971,113 B2
(45) Date of Patent: May 15, 2018

(54) OPTICAL RECEIVER MODULE

(71) Applicant: Sumitomo Electric Industries, Ltd., Osaka-shi (JP)

(72) Inventor: Hiroshi Hara, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days. days.

(21) Appl. No.: 15/415,636

(22) Filed: Jan. 25, 2017

(65) Prior Publication Data
US 2017/0212320 A1 Jul. 27, 2017

(30) Foreign Application Priority Data
Jan. 26, 2016 (JP) .................. 2016-012467

(51) Int. Cl.
*H04J 14/02* (2006.01)
*H04B 10/69* (2013.01)
*G02B 6/42* (2006.01)
*G02B 6/293* (2006.01)

(52) U.S. Cl.
CPC ......... *G02B 6/4245* (2013.01); *G02B 6/2938* (2013.01); *G02B 6/29367* (2013.01); *G02B 6/425* (2013.01); *G02B 6/4206* (2013.01); *G02B 6/428* (2013.01); *G02B 6/4257* (2013.01); *H04B 10/69* (2013.01); *H04J 14/02* (2013.01)

(58) Field of Classification Search
CPC combination set(s) only.
See application file for complete search history.

(56) References Cited

U.S. PATENT DOCUMENTS

| 2002/0097962 | A1* | 7/2002 | Yoshimura | G02B 6/10 385/50 |
| 2009/0097847 | A1* | 4/2009 | Hosomi | G02B 6/29367 398/43 |
| 2010/0209103 | A1 | 8/2010 | Sakigawa et al. | |
| 2010/0278482 | A1* | 11/2010 | Adachi | G02B 6/4204 385/33 |
| 2012/0181535 | A1* | 7/2012 | Ito | G02B 6/428 257/48 |
| 2013/0148970 | A1 | 6/2013 | Nakajima et al. | |

(Continued)

FOREIGN PATENT DOCUMENTS

| JP | 2009-198576 A | 9/2009 |
| JP | 2009-198958 A | 9/2009 |
| JP | 2011-209367 A | 10/2011 |

*Primary Examiner* — David Payne
*Assistant Examiner* — Omar S Ismail
(74) *Attorney, Agent, or Firm* — Venable LLP; Michael A. Sartori; Laura G. Remus

(57) ABSTRACT

An optical receiver module that recovers signals from a wavelength multiplexed optical signal is disclosed. The optical receiver module includes photodiodes (PDs) arranged in an array by a pitch, an amplifier that integrates trans-impedance amplifiers (TIAs) each corresponding to the PDs, and a sub-mount that mounts the PDs thereon. The sub-mount provides metal patterns on which the PDs are mounted by the flip-chip bonding. The metal patterns compensate a difference between the pitch of the arrayed PDs and another pitch of the TIAs in the amplifier as maintaining the characteristic impedance thereof substantially equal to each other.

13 Claims, 7 Drawing Sheets

(56) References Cited

U.S. PATENT DOCUMENTS

| | | | |
|---|---|---|---|
| 2013/0209027 A1* | 8/2013 | Yu | G02B 6/12 385/14 |
| 2014/0346323 A1 | 11/2014 | Fujimura et al. | |
| 2015/0055665 A1 | 2/2015 | Nakajima | |
| 2015/0365175 A1 | 12/2015 | Kawamura et al. | |
| 2015/0365176 A1 | 12/2015 | Kawamura et al. | |
| 2016/0170145 A1 | 6/2016 | Kawamura et al. | |

\* cited by examiner

OPTICAL RECEIVER MODULE

BACKGROUND

1. Field of the Invention

The present invention relates to an optical receiver module, in particular, relates to an optical receiver module that receives a wavelength multiplexed optical signal and recovers data contained in optical signals constituting the wavelength multiplexed optical signal.

2. Background Arts

Recent advancement in the optical communication system has requested devices installed therein, such as an optical transceiver, an optical transmitter module, and/or an optical receiver module, to be applicable to the transmission speed of 40 Gbps, 100 Gbps or higher. Such high speed system often implements the wavelength multiplexed optical signal. A Japanese Patent application laid open No. 2009-198958 has disclosed an optical receiver module that receives a wavelength multiplexed optical signal by several photodiodes (PD) arranged in an array.

When an optical receiver module installs several PDs arranged in an array and amplifiers that amplify faint signals generated by respective PDs, the optical receiver module sometimes causes skews between electrical signals output from the optical receiver module due to differences in physical lengths between the PDs and the amplifiers. The optical receiver module of the present invention enables to output the electrical signals each converted from the optical signals constituting the received wavelength multiplexed optical signal with substantially no skews.

SUMMARY OF INVENTION

One aspect of the present invention relates to an optical receiver module. The optical receiver module receives a wavelength multiplexed optical signal that multiplexes optical signals having wavelengths different from each other and recovers data contained in the optical signals. The optical receiver module comprises photodiodes, amplifiers, and a sub-mount. The photodiodes receive the optical signals and generate electrical signals. The amplifiers, which are provided corresponding to the photodiodes, amplify the electrical signals and output the data. The sub-mount provides metal patterns that electrically connect the photodiodes with the amplifiers. The metal patterns mount the photodiodes thereon by a flip-chip arrangement at respective ends thereof; and wire-bonded to the amplifiers at respective another ends thereof. The metal patterns have a first pitch at the respective ends and a second pitch different from the first pitch at the another respective ends. A feature of the optical receiver module is one of the metal patterns has a first length from the end to the another end and another of the metal patterns has a second length from the end to the another end longer than the first length, where the one of the metal patterns has characteristic impedance substantially equal to characteristic impedance of the another of the metal patterns.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment according to the present invention will be described as referring to drawings. Also, the present invention is not restricted to the embodiment and directed to those explicitly defined in claims but covers all changes and modifications done within a scope of the claims and equivalents thereof. In the description of the embodiment, numerals or symbols same with or similar to each other will refer to elements same with or similar to each other without duplicating explanations.

First Embodiment

Figure 1:
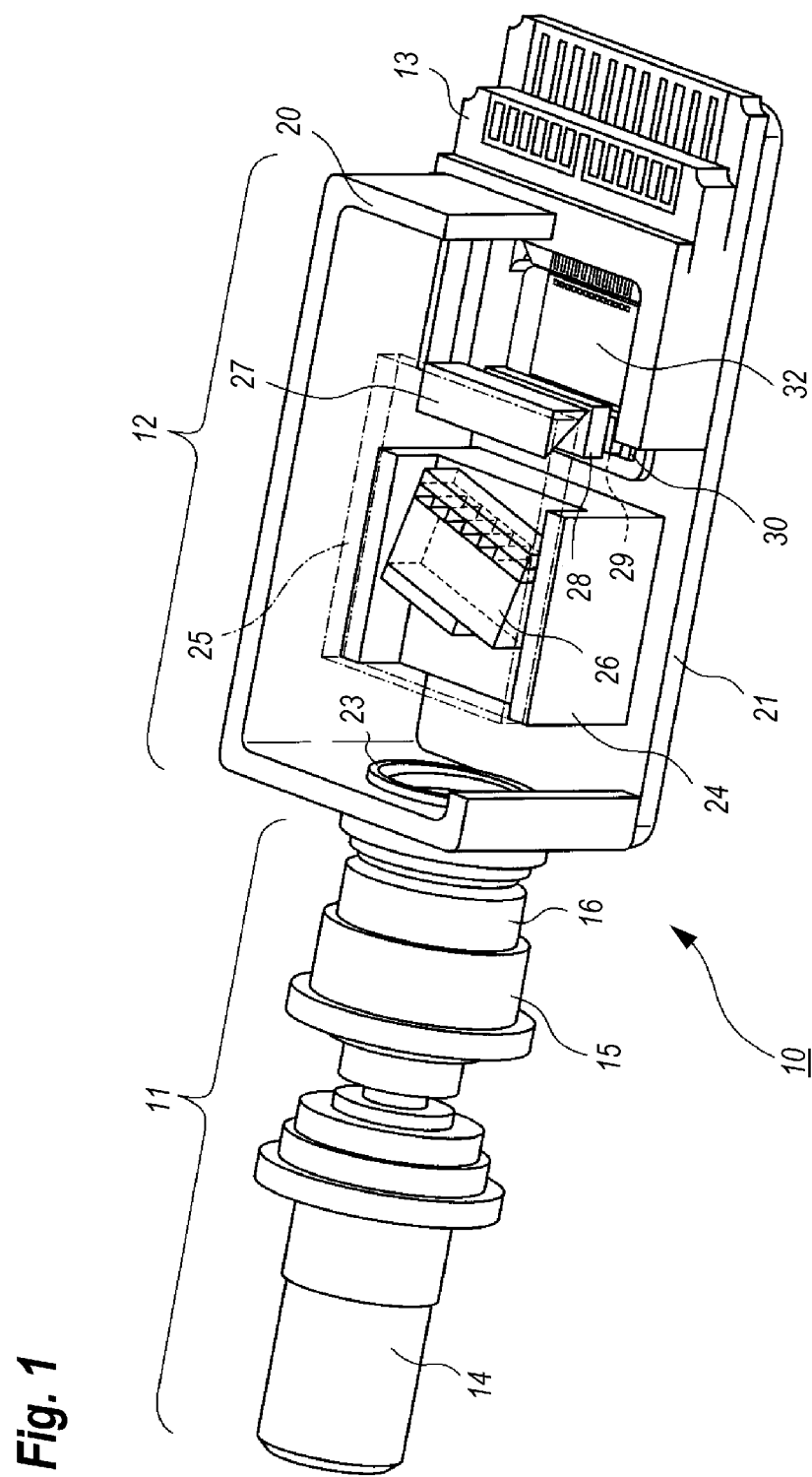
FIG. 1 is a perspective view of an optical receiver module according to embodiment of the present invention.
Figure 2:
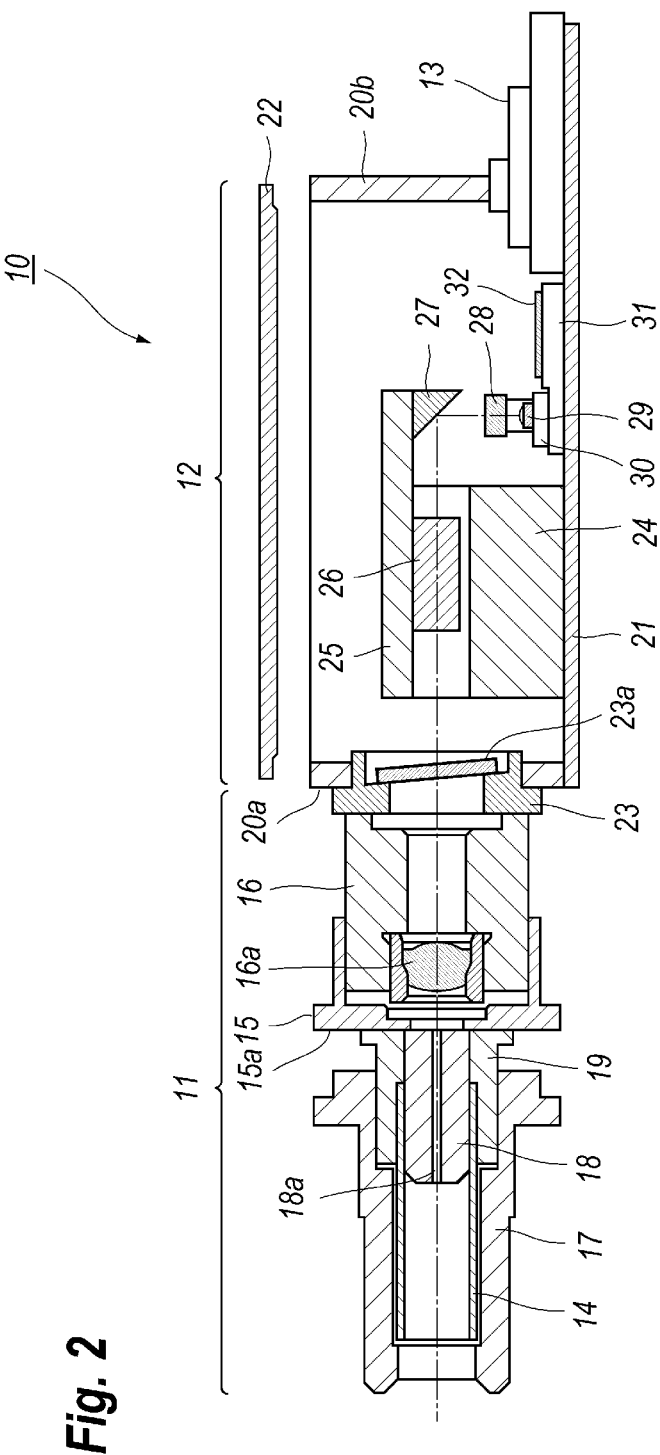
FIG. 2 shows a side cross section of the optical receiver module shown in FIG. 1.

FIG. 1 is a perspective view of an optical receiver module according to the first embodiment of the present invention, where FIG. 1 removes a portion of a lid to show an inside of the optical receiver module 10, and FIG. 2 shows a side cross section of the optical receiver module 10.

The optical receiver module 10 show in FIGS. 1 and 2 receives a wavelength multiplexed optical signal that multiplexes optical signals each having a specific wavelength different from each other, and recovers information contained in the optical signals. The optical receiver module 10 provides a coupling unit 11, which couples with an external single mode fiber not shown in the figures, and a package 12 that encloses optical devices and electrical devices therein. The package 12 provides in a rear end thereof terminals 13 for communicating with an external. The coupling unit 11 includes a sleeve 14, a holder 16, an aligning member 15, and a cover 17. The sleeve 14 receives an external connector attached in an end of the external single mode fiber. The holder 16 is member to fix the optical coupling unit 11 to the package 12. The aligning member 15 optical aligns the sleeve 14, exactly, the external single mode fiber set within the sleeve 14, with the package 12, exactly, the optical devices enclosed within the package 12. The description below assumes that a direction of 'forward' and/or 'front' corresponds to a side where the coupling unit 11 is provided with respect to the package 12, while, another direction of 'rear' and/or 'back' corresponds to a side where the terminal 13 is provided. However, these limitations of the directions are merely for the explanation sake, and could not affect the scope of the present invention.

The package 12, which has a box-shape, includes a frame 20, a bottom 21, and lid 22. Those members of the frame 20, the bottom 21, and the lid 22 may form a cavity within which the optical devices and the electrical devices are enclosed. Referring to FIG. 2, the specification below also assumes that a direction 'up' and/or 'upward' corresponds to a side where the lid 22 is provided with respect to the frame 20, while, another direction 'down' and/or 'downward' corresponds to a direction where the bottom 21 is provided with respect to the frame 20. However, these limitations do not also affect the scope of the invention. The frame 20 provides a bush 23 in a front wall 20a thereof. The lid 22 is fixed to a top of the frame 20 to seal the cavity air-tightly. The terminal 13, which is assembled with a rear wall 20b of the frame 20, may be made of multi-layered ceramics, where one of the ceramic layers provides interconnections extending from the inside of the cavity to the external. The interconnections include signals lines that carry high frequency signals and power lines that carry power within the cavity.

The sleeve 14, the aligning member 15, and the holder 16 in the coupling unit 11 have respective cylindrical shapes. The holder 16, as FIG. 2 indicates, is fixed to the frame 20 in the front wall 20a through the bush 23, while fixes the sleeve 14 through the aligning member 15. The aligning member 15 optically aligns the sleeve 14, exactly the external fiber set within the sleeve 14 with the optical device installed within the frame 20. Specifically, the optical alignment along the optical axis of the coupling unit 11 may be carried out by adjusting an overlapping length between the aligning member 15 and the holder 16. On the other hand, the optical alignment in a plane perpendicular to the optical axis of the coupling unit 11 may be carried out by sliding members including the sleeve 14 on a surface 15a of the aligning member 15. The members provided upstream of the aligning member 15 include, in addition to the sleeve 14, a stub 18 accompanying with a coupling fiber 18a in a center thereof, a sleeve cover 17, and another bush 19. The sleeve 14 secures a top portion of the stub 18 in a root thereof, while, receives in a front portion thereof the external connector, exactly, a ferrule secured in the tip end of the external fiber set within the external connector. The bush 19 holds a root portion of the stub 18 and is press-fitted in a front portion thereof between the sleeve 14 and the sleeve cover 17. In other word, the sleeve 14 in the root portion thereof is press-fitted between the front portion of the stub 18 and the front portion of the bush 19. The coupling unit 11 thus arranged in the front portion thereof may securely receive the ferrule of the external connector, and the external fiber held in a center of the ferrule may optically couple with the coupling fiber 18a in the center of the stub 18 so as to make a physical contact (PC) therebetween. The aligning member 15 may optically align another end of the coupling fiber 18a that faces the lens 16a with the optical devices in the cavity of the package 12. The wavelength multiplexed optical signal output from the end of the coupling fiber 18a is collimated by the lens 16a in the holder 16 and enters within the cavity through a window 23a held in the bush 23.

The optical devices installed within the cavity are an optical de-multiplexer 26, a mirror 27, an arrayed lens 28, and photodiodes (PD) 29. The optical de-multiplexer 26 de-multiplexes the wavelength multiplexed optical signal entering the optical receiver module 10 into the optical signals depending on the wavelengths of the optical signals. The mirror 27 reflects the optical signals de-multiplexed by the optical de-multiplexer 26 toward the arrayed lens 28 set downward of the mirror 27. In the present optical receiver module 10, the optical de-multiplexer 26 and the mirror 27 are mounted on a carrier 25 so as to face the bottom of the package 21. That is, the optical de-multiplexer 26 and the mirror 27 are mounted on the back surface of the carrier 25.

Figure 3:
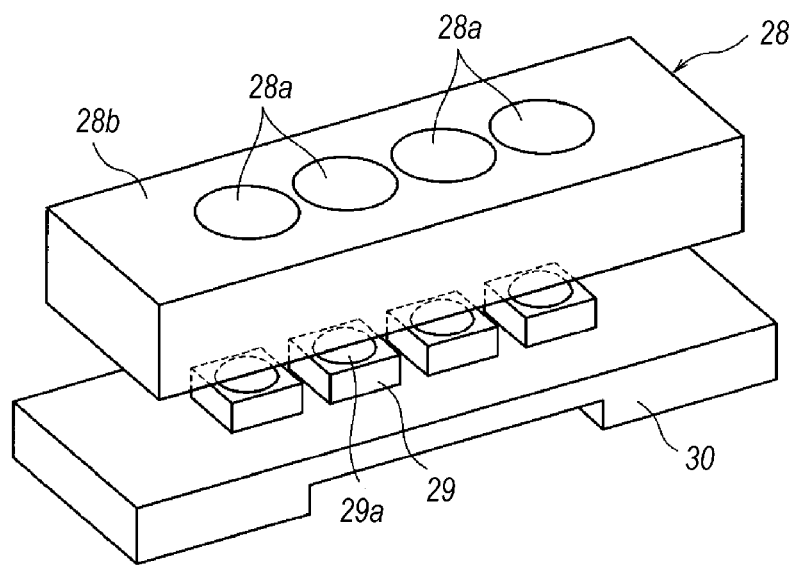
FIG. 3 is a perspective view showing an arrayed lens and photodiodes installed within the optical receiver module.

Referring to FIG. 3, the arrayed lens 28, which includes a plurality of lens elements 28a, is assembled on the sub-mount 30 that mounts the PDs 29 through a pair of posts set in respective sides of an array of the PDs 29 and on the sub-mount 30. The posts, which are not shown in the figures, may adjust a distance between the arrayed lens 28 and the PDs 29. FIG. 3 omits details of the paired posts.

As FIG. 3 illustrates, the arrayed lens 28 integrates four lens elements 28a in a body 28b made of material substantially transparent in wavelengths of the optical signals. The body 28b, and the lens elements 28a, may be made of silica glass. The PDs 29, which is assembled in the array so as to face the lens elements 28a through the body 28b. The PDs 29 receive the optical signals reflected by the mirror 27 and concentrated by the lens elements 28a. The PDs 29 of the present embodiment are a type of, what is called, the back-illumination, where light enters in a back surface of a substrate on which primary structures of the PDs 29 are formed in a top surface thereof. That is, the top surface of the substrate of the PDs 29 provides optically sensitive semiconductor layers and electrodes through which electrical signals are extracted; while, the back surface receives light that reaches the optical sensitive semiconductor layers in the top surface as passing through the substrate. Accordingly, the PDs 29 provide convex surfaces 29a operable as a concentrating lens.

The sub-mount 30, which mounts the PDs 29, provides metal patterns, 30a and 30b, on the top surface thereof. That is, the PDs 29 in the top surfaces thereof face against the sub-mount 30 such that the electrodes on the top surfaces are soldered to the metal patterns on the sub-mount 30, which configures, what is called, the flip-chip arrangement.

Referring back to FIG. 2, the optical receiver module 10 installs the optical de-multiplexer 26 and the mirror 27 on the back surface of the carrier 25 such that the optical de-multiplexer 26 and the mirror 27 face the bottom 21 of the frame 20. Also, the mirror 27, the arrayed lens 28 and the PDs 29 are vertically arranged in a space beneath the carrier 25. This arrangement of the optical devices, 26 to 29, may generate an enough space for installing the electrical devices, such as a trans-impedance amplifier TIA 32 for amplifying faint signals generated by the PDs 29 within the cavity of the frame 20.

Figure 4:
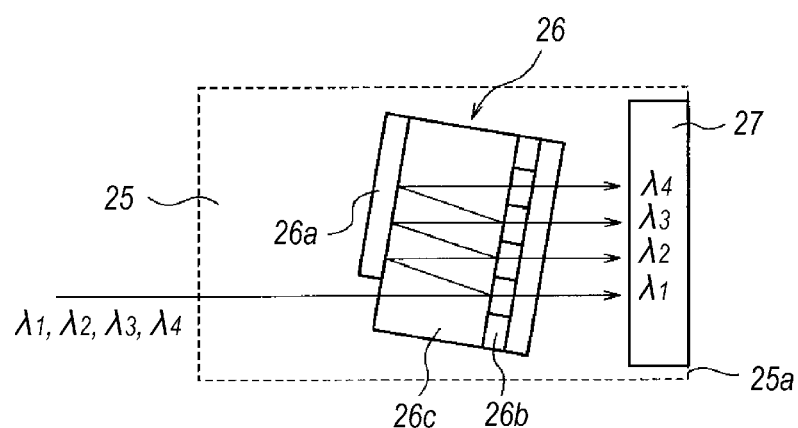
FIG. 4 schematically illustrates an optical coupling system of the optical receiver module of the present invention.

FIG. 4 schematically illustrates a function of the optical de-multiplexer 26. The optical de-multiplexer 26 of the present embodiment provides a reflector 26a and wavelength selective filters (WSFs) 26b in respective sides of a body 26c that is made of material substantially transparent for the wavelengths of the optical signals. The optical de-multiplexer 26 is mounted in a center of the carrier 25 as making a substantial angle with respect to the optical axis of the wavelength multiplexed optical signal coming through the window 23a; while, the mirror 27, which may be a prism mirror with a triangular cross section, is mounted in the rear end of the carrier 25. An oblique side of the prism mirror, which is a reflecting side, faces the optical de-multiplexer 26 and the arrayed lens 28.

The WSFs 26b of the optical de-multiplexer 26, where each of the WSFs 26b may be made of multi-layered dielectric films, have cut-off frequencies different from each other. The wavelength multiplexed optical signal multiplexing the optical signals having wavelengths, $\lambda_1$ $\lambda_4$, enters the first WSFs 26 that transmits the optical signal with the wavelength $\lambda_1$ but reflects other optical signals with wavelengths, $\lambda_2$ to $\lambda_4$. The reflected optical signals enter the second WSF 26b after reflected by the reflector 26a. The second WSF 26b transmits the optical signal with the wavelength of $\lambda_2$, but reflects the rest. Iterating the optical functions of the reflection by the reflector 26a and transmitting/reflecting by the WSFs 26b, the optical de-multiplexer 26 may output the respective optical signals with the wavelengths, $\lambda_1$ to $\lambda_4$, independently from the positions laterally offset to each other. The optical signals thus de-multiplexed by the optical de-multiplexer 26 enters the PDs 29 after reflected downward by the mirror 27 and concentrated by the lens elements 28a and those 29a integrated on the back surfaces of the PDs 29.

Figure 5A:
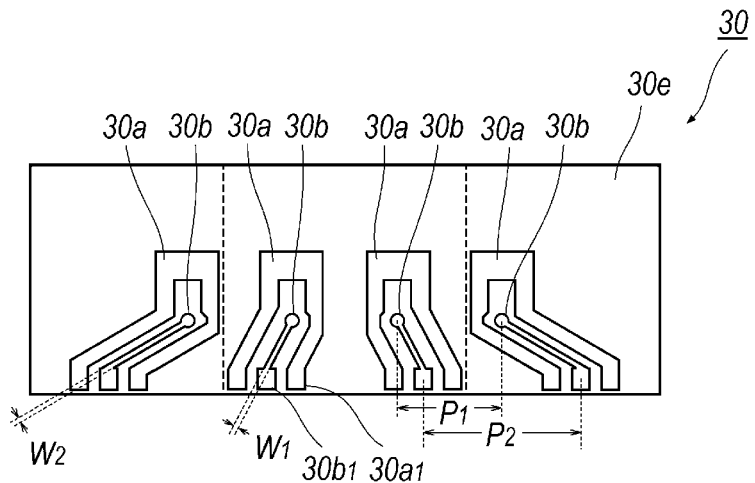
FIGS. 5A to 5C show details of the sub-mount that mounts PDs thereon.
Figure 5B:
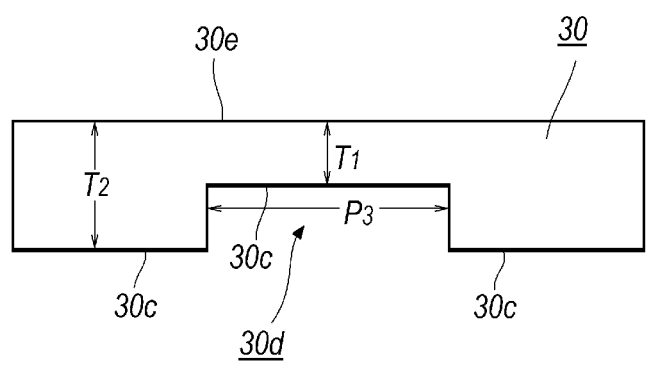
Figure 5C:
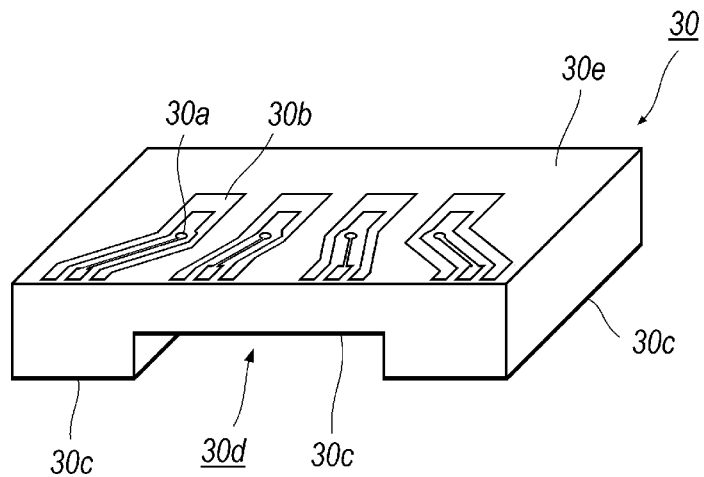

The optical receiver module 10 of the present embodiment has a feature in an arrangement of the sub-mount 30. FIGS. 5A to 5C are a plan view, a side view, and perspective view of the sub-mount 30 of the present embodiment.

The sub-mount 30 of the present embodiment, which may be made of aluminum nitride (AlN), provides metal patterns 30b directly connected to the anodes of the PDs 29; and other metal patterns 30a that are directly connected to the cathodes of the PDs 29 and surround the respective metal patterns 30b. Thus, the PDs 29 are mounted on the metal patterns, 30a and 30b, in the respective one ends by the flip-chip arrangement. The sub-mount 30 also provides a ground pattern 30c in a whole back surface thereof including a depressed portion 30d.

The metal patterns 30b provide pads 30b1 in a rear end of the sub-mount 30 where the pads 30b1 are connected to the TIA 32 in signal input terminals thereof directly. The metal patterns 30a also provide pads 30a1 in the rear end of the substrate 30. The pads 30a1 that sandwich the signal pads 30b1 therebetween are connected to bias terminals in the TIA 32, where the bias terminals provide biases to the respective cathodes of the PDs.

The optical receiver module 10 of the present embodiment provides the several PDs 29, four PDs 29 in the present embodiment, arranged in an array with a constant pitch $P_1$ along a lateral direction of the frame 20, where the pitch $P_1$ is different from a pitch $P_2$ between the signal pads 30b1, which is determined by the pitch of the signal input terminals of the TIA 32. On the other hand, the former pitch P1 for the arrayed PDs 29 may be primarily determined by the function of the optical de-multiplexer 26, namely, an angle between the normal of the light input port of the optical de-multiplexer 26 and the optical axis of the wavelength multiplexed optical signal entering therein. As increasing this tilt angle of the optical de-multiplexer 26, the pitch $P_1$ between the PDs 29 increases. However, the enhanced tilt angle of the optical de-multiplexer 26 degrades the wavelength de-multiplexing function thereof. On the other hand, decreasing the pitch $P_2$ between the pads 30b1, the wire-bonding thereto, also to the cathode pads 30a1, becomes impossible. Accordingly, the pads 30b1 inevitably have a minimum pitch that is greater than the pitch $P_1$ between the arrayed PDs 29.

The metal patterns, 30a and 30b, implemented on the surface of the sub-mount 30 may compensate the difference between the pitches, $P_1$ and $P_2$. That is, the metal patterns, 30a and 30b, for placing the PDs 29 thereon by the flip-chip arrangement have the pitch $P_1$, while, the pads, 30a1 and 30b1, for wire-bonding to the TIA 32 have the pitch $P_2$ which is wider than the former pitch $P_1$. Because of this compensation of the difference between the pitches, the metal patterns 30b provided in respective outer sides of the sub-mount 30 are forced to be formed longer compared with those in the inner sides.

Also, the metal patterns 30b in the outer sides have a width $W_2$ greater than a width $W_1$ of the inner anode patterns 30b. The sub-mount 30 of the present embodiment provides a depressed portion 30d in the back surface thereof, that is, the sub-mount 30 has an inner thickness $T_1$ smaller than an outer thickness $T_2$. The metal patterns, 30a and 30b, corresponding to the PDs 29 arranged inner overlap with the depressed portion 30d, that is, those metal patterns, 30a and 30b, are formed in a portion of the sub-mount 30 having a smaller thickness $T_1$, while, the metal patterns, 30a and 30b, corresponding to the PDs 29 arranged outer are formed on another portion of the sub-mount 30 with a greater thickness $T_2$.

As described, a portion of the metal patterns 30b in the respective outer sides are inevitably formed longer in order to compensate the pitch difference between the PDs 29 and the signal pads in the TIA 32, which means, the metal patterns 30b in the outer sides cause greater transmission losses compared with those in the inner side. Widening the metal patterns 30b in the outer sides, the transmission loss may be suppressed, or the transmission losses of the outer patterns become comparable to those of the inner patterns. Widened metal patterns 30b may vary the characteristic impedance thereof, specifically, may lower the characteristic impedance. In order to compensate the reduction of the characteristic impedance, the sub-mount 30 in the outer portions thereof have the thickness $T_2$ greater than the thickness $T_1$ in the inner portion. The sub-mount 30 of the present embodiment sets the transmission impedance of the metal patterns 30b in both of the inner patters and the outer patterns to be around 100 Ω. Thus, the metal patters 30b in both of the inner sides and the outer sides have characteristic impedance thereof substantially equal to each other; accordingly, the metal patterns 30b cause no skews between the electrical signals carried thereon. In other words, the sub-mount 30 of the present embodiment may compensate the difference in the pitch of the arrayed PDs 29 and that of the signal pads in the TIA 32 without causing the skew between the signals by widening the metal patterns 30b and thickening the sub-mount 30 to match the characteristic impedance between the metal patterns 30b.

Figure 6A:
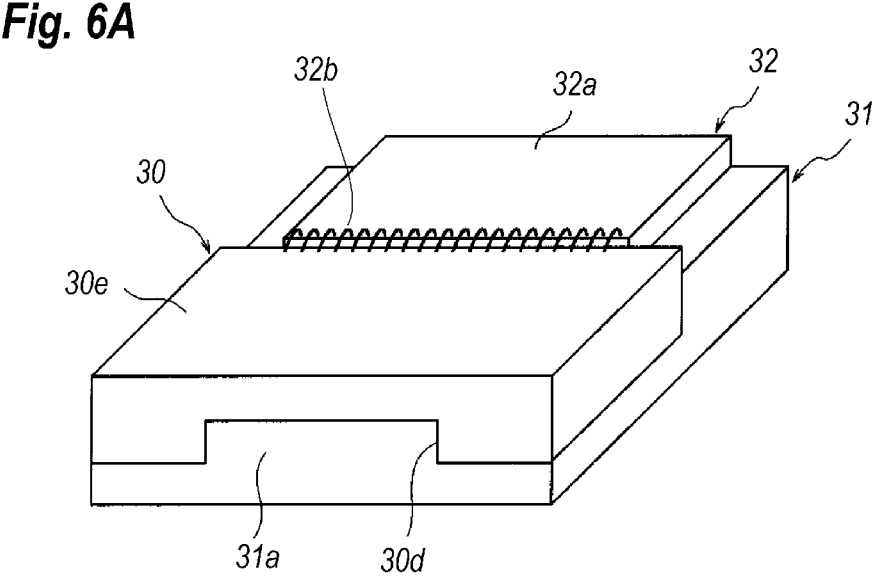
FIG. 6A is a perspective view of the base mounting the sub-mount and an amplifier that integrates trans-impedance amplifies.
Figure 6B:
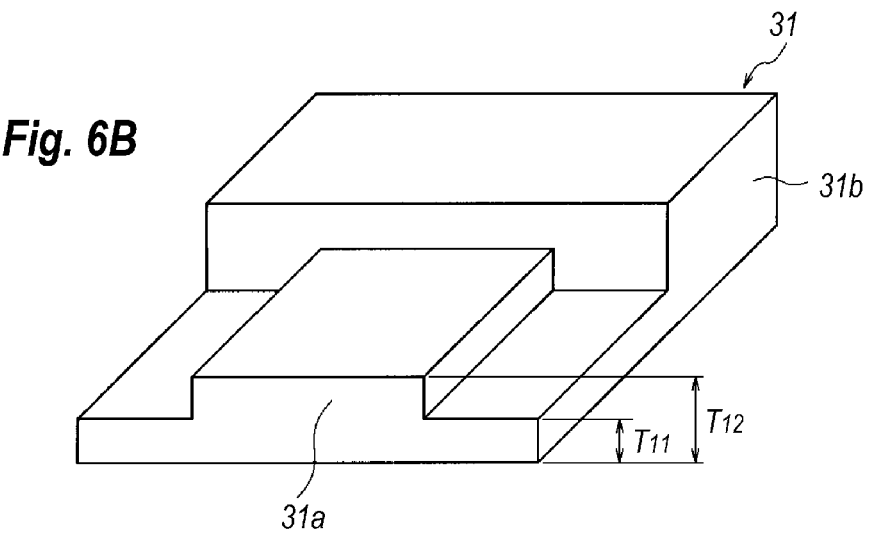
FIG. 6B shows an outer appearance of the base.

FIG. 6A is a perspective view of the base 31 that mounts the sub-mount 30 and the TIA 32 thereon, and FIG. 6B shows an outer appearance of the base 31.

The base 31 provides a terraced portion 31a whose shape traces the shape of the depressed portion 30d of the sub-mount 30. That is, the base 31 in the terraced portion 31a fits the sub-mount 30 in the depressed portion 30d. When the base 31 has no terraced portion 31a, the base 31 forms a gap in the depressed portion 30d of the sub-mount 30 and the bonding wires become hard to be bonded to the pads, 30a1 and 30b1. Also, the gap may absorb ultrasonic waves during the ultrasonic bonding or increases thermal resistance for the thermos-compression bonding. The arrangement of the depressed portion 30d in the sub-mount 30 and the terraced portion 31a in the base 31 may prevent the gap from being formed therebetween and the wire-boding may be carried out to the pads, 30a1 and 30b1. The sub-mount 30 is mounted on the base 31 by putting electrically conductive resin therebetween, which securely connects the ground patter on the back surface 30c of the sub-mount to the base 31 made of metal.

The base 31 further provides a surface on which the TIA 32 is mounted. The top surface 32a of the TIA 32, when mounted on a mounting portion 31b of the base 31, preferably has a level substantially equal to a level of the top surface 30e of the sub-mount 30 also mounted on the base 31. That is, the top level of the TIA 32 measured from the bottom surface of the base 31 may be aligned with the top level 30e of the sub-mount 30 mounted on the base 31, which may shorten lengths of the bonding wires 32b connecting the pads 30b1 on the sub-mount 30 to the signal pads on the TIA 32. Also, the top level 32a of the TIA 32, when mounted on the base 31, is preferably aligned with a level of the terminals 13 shown in FIG. 1, which may also shorten lengths of the bonding wires connecting the pads on the TIA 32 to the terminals 13.

The sub-mount 30 of the present embodiment is preferably made of aluminum nitride (AlN) with the back metal made of multi-layered metals of titanium and gold (Ti/Au) or titanium, platinum, and gold (Ti/PT/Au). The pitch $P_1$ of the arrayed PDs 29 is set to be around 0.5 mm, while, the pitch $P_2$ of the signal pads in the TIA 32 is set to be about 0.75 mm. The metal patterns 30b in the outer sides have a length of 0.5 mm and those in the inner side are about 0.3 mm; while, the metal patterns 30b have a width $W_2$ of 60 μm and those $W_1$ for the inner side of 20 μm. The depressed portion 30d in the back surface thereof has a width $P_3$ of 1.2 mm, while two thicknesses, $T_1$ and $T_2$, are 0.2 mm and 0.5 mm, respectively. The metal patterns 30b thus configured may have the characteristic impedance thereof substantially equal to each other and cause no skews between the signals.

The base 31, which may be made of copper tungsten (CuW) or copper molybdenum (CuMo), has a height $T_{11}$ of 0.4 mm corresponding to the outer sides of the sub-mount 30, while, another height $T_{12}$ of 0.7 mm corresponding to the depressed portion 30d of the sub-mount 30. The base 31 thus configured makes the top surface 30e of the sub-mount 30 to have a height 0.9 mm measured from the bottom surface of the base 31 without forming any gap against the sub-mount 30.

The base 31 of the present embodiment has the terraced portion 31a that physically continue to the mounting portion 31b as FIG. 6B illustrates. However, the base 31 may provide a groove between the terraced portion 31a and the mounting portion 31b in order to enhance process accuracy thereof.

Second Embodiment

Figure 7A:
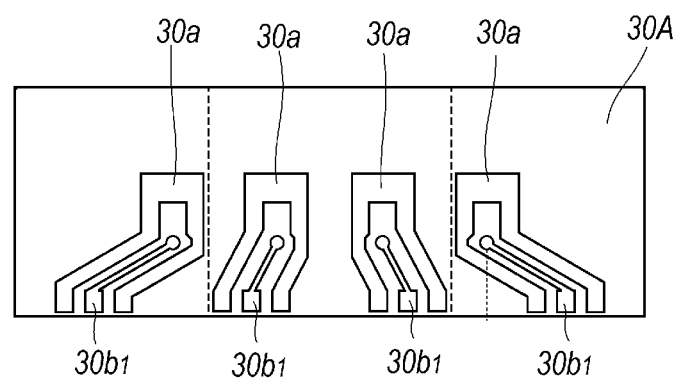
FIGS. 7A and 7B show another sub-mount according to the second embodiment of the present invention.
Figure 7B:
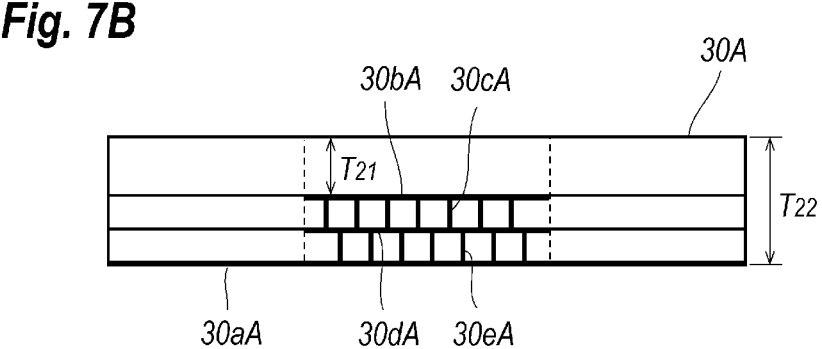

FIG. 7A is a plan view of the sub-mount 30A according to the second embodiment of the present invention, and FIG. 7B shows a cross section thereof. The sub-mount 30A has an arrangement on the top surface 30e same with those of the first embodiment shown in FIG. 5A, but provides no depressed portion 30d in the back surface thereof. That is, the top surface 30e provides the metal patterns, 30a and 30b, for the anodes and the cathodes of the arrayed PDs 29 that compensate the difference between the pitch $P_1$ for the arrayed PDs 29 and that $P_2$ for the signal pads on the TIA 32.

The sub-mount 30A provides, instead of the depressed portion 30d in the first embodiment, several ground layers, 30bA and 30dA, in a portion corresponding to the inner side of the arrayed PDs 29. That is, the sub-mount 30A of the embodiment may be made of multi-layered ceramics, where each of layers provides the ground metals, 30bA and 30dA, in the portion corresponding to the inner side of the arrayed PDs 29. The ground metal 30bA in the first ceramic layer is connected to the second metal 30dA with via metals 30cA, while, the second metal 30dA is connected to the back meal 30aA, which is the ground pattern extending in the whole of the back surface of the sub-mount 30A, with other via metals 30eA.

The sub-mount 30A thus configured equivalently provides thicknesses, T21 and T22, in the inner side and the outer sides thereof, where the former thickness T21 corresponds to a thickness of the first ceramic layer, while, the latter thickness T22 corresponds to a total thickness of the multi-layered ceramics. Thus, the sub-mount 30A may equivalently realize the arrangement of the sub-mount 30 with the depressed portion 30d. The difference between the pitches, $P_1$ and $P_2$, in the arrayed PDs 29 and in the signal pads of the TIA 32 may be compensated by a difference between the thicknesses, $T_{21}$ and $T_{22}$, of the sub-mount 30A, which means that, the metal patterns 30b in the outer sides have an enhanced width compared with those provided in the inner side although the metal patterns 30b in the outer sides inevitably have prolonged lengths. Also, the metal patterns 30b in the outer sides have the characteristic impedance thereof comparable to those of the inner side because of the enhanced thickness $T_{22}$. Thus, even the sub-mount 30A causes no skews in the electrical signal between the arrayed PDs 29 and the TIA 32. Moreover, the sub-mount 30A of the second embodiment may omit the terraced portion 31a in the base 31, which may simplify the arrangement of the base 31.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

The present application claims the benefit of priority of Japanese Patent Application No. 2016-012467, filed on Jan. 26, 2016, which is incorporated herein by reference.

I claim:

1. An optical receiver module that receives a wavelength multiplexed optical signal multiplexing optical signals having wavelengths different from each other and recovers data contained in the optical signals, the optical receiver module comprising:

photodiodes that receive the optical signals and generate electrical signals;

amplifiers corresponding to the photodiodes, the amplifiers amplifying electrical signals and outputting the data;

a sub-mount providing metal patterns that electrically connect the photodiodes with the amplifiers, the metal patterns mounting the photodiodes thereon by a flip-chip arrangement at respective ends of the metal patterns and being wire-bonded to the amplifiers at respective another ends of the metal patterns, the metal patterns having a first pitch at the respective ends and a second pitch different from the first pitch at the another respective end; and a box shaped package with a longitudinal direction and a lateral direction; the photodiodes, the amplifiers, and the metal patterns are arranged in respective arrays each along the lateral direction of the box shaped package, wherein one of the metal patterns has a first length from the end to the another end of the sub-mount, and another of the metal patterns has a second length from the end to the another end of the sub-mount, the second length being longer than the first length, wherein the one of the metal patterns has characteristic impedance substantially equal to characteristic impedance of the another of the metal patterns, and wherein the sub-mount has an inner portion and an outer portion along the lateral direction of the box shaped package, the inner portion providing the one of the metal patterns and having a thickness thereof, the outer portion providing the another of the metal patterns and having a thickness thicker than the thickness of the inner portion.

2. The optical receiver module of claim 1,
wherein the one of the metal patterns has a width that is narrower than a width of the another of the metal patterns.

3. The optical receiver module of claim 1,
further providing a base that mounts the sub-mount and the amplifiers thereon,
wherein the base provides a terraced portion that fits with the inner portion of the sub-mount and a mounting portion that mounts the amplifiers thereon.

4. The optical receiver module of claim 3,
wherein the base provides a groove between the terraced portion and the mounting portion.

5. The optical receiver module of claim 3,
wherein the mounting portion has a thickness greater than a thickness of the terraced portion, the amplifiers in a top level thereof being substantially aligned with a top surface of the sub-mount.

6. An optical receiver module that receives a wavelength multiplexed optical signal multiplexing optical signals having wavelengths different from each other and recovers data contained in the optical signals, the optical receiver module comprising:
photodiodes receiving the optical signals and generating electrical signals;
amplifiers corresponding to the photodiodes, the amplifiers amplifying electrical signals and outputting the data; and
a sub-mount providing metal patterns that electrically connect the photodiodes with the amplifiers, the metal patterns mounting the photodiodes thereon by a flip-chip arrangement at respective ends thereof and being wire-bonded to the amplifiers at respective another ends thereof, the metal patterns having a first pitch at the respective ends and a second pitch different from the first pitch at the another respective ends,
wherein the optical receiver module has a box shaped package with a longitudinal direction and a lateral direction; the photodiodes, the amplifiers, and the metal patterns being arranged in respective arrays each along the lateral direction of the box shaped package,
wherein one of the metal patterns has a first length from the end to the another end of the sub-mount and another of the metal patterns has a second length from the end to the another end of the sub-mount, the second length being longer than the first length, the one of the metal patterns having characteristic impedance substantially equal to characteristic impedance of the another of the metal patterns,
wherein the sub-mount has an inner portion and an outer portion along the lateral direction, the inner portion providing the one of the metal patterns and having an inner metal layer, the outer portion providing the another of the metal patterns and having no inner metal layer but providing a back metal layer electrically connected to the inner metal layer, and
wherein the one of the metal patterns has a distance to the inner metal layer that is smaller than a distance between the another of the metal patterns to the back metal layer in the outer portion.

7. The optical receiver module of claim 6,
wherein the sub-mount is made of multi-layered ceramics including at least a first ceramic layer and a second ceramic layer, the first ceramic layer providing a top surface of the sub-mount and the inner metal layer in a back surface thereof, the second ceramic layer providing the back metal layer.

8. The optical receiver module of claim 6,
further including a base having a mounting portion on which the sub-mount and the amplifiers are mounted,
wherein the amplifiers in a top level thereof being substantially equal to a top surface of the sub-mount mounted on a portion except for the mounting portion.

9. The optical receiver module of claim 1,
further includes an arrayed lens that includes lens elements,
wherein the arrayed lens is mounted on the sub-mount, the lens elements facing the photodiodes in up and down arrangement.

10. The optical receiver module of claim 9,
wherein the photodiodes have convex surfaces facing the lens elements.

11. The optical receiver module of claim 6, further includes an arrayed lens that includes lens elements,
wherein the arrayed lens is mounted on the sub-mount, the lens elements facing the photodiodes in up and down arrangement.

12. The optical receiver module of claim 11,
wherein the photodiodes have convex surfaces facing the lens elements.

13. The optical receiver module of claim 11,
wherein the one of the metal patterns has a width that is narrower than a width of the another of the metal patterns.

* * * * *